United States Patent [19]
So

[11] Patent Number: 5,565,865
[45] Date of Patent: Oct. 15, 1996

[54] KEY SWITCH UNIT FOR COMPUTER KEYBOARDS

[76] Inventor: Henry So, No. 27, Lane 52, Sec. 4, Nan King E. Rd., Taipei, Taiwan

[21] Appl. No.: 411,016

[22] Filed: Mar. 27, 1995

[51] Int. Cl.[6] .......................... H03K 17/94; H03M 11/00
[52] U.S. Cl. ............................. 341/20; 341/22; 400/490
[58] Field of Search ............................. 400/490, 491, 400/491.1, 495, 496; 341/20, 22

[56] References Cited

U.S. PATENT DOCUMENTS

| | | | |
|---|---|---|---|
| 4,830,526 | 10/1989 | Hosono | 400/490 |
| 5,172,990 | 12/1992 | Weng | 400/490 |
| 5,209,588 | 5/1993 | Chen | 400/490 |

FOREIGN PATENT DOCUMENTS 0091284  10/1983  United Kingdom ................. 400/490

OTHER PUBLICATIONS

IBM Technical Disclosure Bulletin vol. 26 & vol. 27 Dogleg Keybutton Guide Design, S. A. Gaunce and Actuator Key, H. F. Lutz.

*Primary Examiner*—Jeffery Hofsass
*Assistant Examiner*—Timothy Edwards, Jr.
*Attorney, Agent, or Firm*—Merchant, Gould, Smith, Edell, Welter & Schmidt, P.A.

[57] ABSTRACT

A key switch unit including a key holder frame having a plurality of key holders respectively mounted on the rubber cones of a conductive rubber pad above a membrane circuit, and one L-shaped key switch and a plurality of elongated key switches and a plurality of square key switches respectively mounted on the key holders and depressed to trigger the membrane circuit to produce a respective electric signal, wherein the key holders each has a center through hole and an inside annular flange within the center through hole; the square key switches each has a stepped long plunger inserted into one key holder; the L-shaped key switch and the elongated key switches each has a stepped long plunger and at least one stepped short plungers respectively inserted into the longitudinal center through hole on a respective key holder on the key holder frame; the stepped long plungers of the square key switches and the L-shaped key switch and the elongated key switches each comprises a thicker upper part inserted into the longitudinal center through hole on the respective key holder and suspended above the respective inside annular flange, a thinner lower part passed through the respective inside annular flange and stopped above the respective rubber cone, the thicker upper part being stopped above the respective inside annular flange to stop the at least one stepped short plunger from triggering the membrane circuit when one L-shaped key switch or one elongated key switch is depressed.

4 Claims, 13 Drawing Sheets

KEY SWITCH UNIT FOR COMPUTER KEYBOARDS

BACKGROUND OF THE INVENTION

The present invention relates to computer keyboards, and relates more particularly to a key switch unit which permits the key switches of different sizes to be arranged at different locations to match with the same design of key holder frame, the same design of conductive rubber pad and the same design of membrane circuit for arranging into any of a variety of keyboard layouts for different purposes.

A regular computer keyboard is generally comprised of a shell, a membrane circuit, a conductive rubber pad supported on the membrane circuit and having a plurality of rubber cones, a key holder frame having a plurality of key holders respectively disposed above the rubber cones, and a set of key switches of different sizes respectively mounted on the key holders of the key holder frame above the rubber cones. The set of key switches include various function control keys of different sizes. When the function control keys are designed to install in different area on the keyboard, the designs of the conductive rubber pad, the membrane circuit, as well as the key holder frame must be relatively changed. Because different conductive rubber pads, membrane circuits and key holder frames must be used for making keyboards of different layouts, the tooling and designing cost is high.

SUMMARY OF THE INVENTION

The present invention has been accomplished under the circumstances in view. It is the principal object of the present invention to provide a key switch unit which can be arranged into any of a variety of forms for assembling different keyboards for different purposes without changing the conductive rubber pad and the membrane circuit. It is another object of the present invention to provide a key switch unit which greatly reduces the manufacturing cost of the computer keyboard.

According to one aspect of the present invention, the key switch unit comprises a key holder frame having a plurality of key holders respectively mounted on the rubber cones of a conductive rubber pad above a membrane circuit, and one L-shaped key switch and a plurality of elongated key switches and a plurality of square key switches respectively mounted on the key holders and depressed to trigger the membrane circuit to produce a respective electric signal, wherein the key holders each has a center through hole and an inside annular flange within the center through hole; the square key switches each has a stepped long plunger inserted into one key holder; the L-shaped key switch and the elongated key switches each has a stepped long plunger and at least one stepped short plungers respectively inserted into the longitudinal center through hole on a respective key holder on the key holder frame; the stepped long plungers of the square key switches and the L-shaped key switch and the elongated key switches each comprises a thicker upper part inserted into the longitudinal center through hole on the respective key holder and suspended above the respective inside annular flange, a thinner lower part passed through the respective inside annular flange and stopped above the respective rubber cone. The thicker upper part of the stepped long plunger will be stopped above the inside annular flange to stop the at least one stepped short plunger from triggering the membrane circuit when one L-shaped key switch or one elongated key switch is depressed. Therefore, the positions of the L-shaped key switch, the elongated key switches and the square key switches on the key holder frame can be changed.

According to another aspect of the present invention, each key holder has a plurality of longitudinal grooves around the respective center through hole, and the stepped long plunger of each key switch has a plurality of longitudinal ribs on the respective thicker upper part respectively inserted into the longitudinal grooves on the respective key holder, and therefore the reciprocating movement of the key switches are smoothened without causing much noise.

According to still another aspect of the present invention, when one key switch is depressed, the bottom ends of the longitudinal ribs of the stepped long plunger will be stopped above the inside annular flange of the respective key holder to limit the down stroke of the key switch so as to prevent damage to the membrane circuit.

According to still another aspect of the present invention, the key cap of each key switch has a flat bottom side spaced above the respective key holder, which flat bottom side will be stopped above the respective key holder to limit the down stroke of the respective key switch when the inside annular flange of the respective key holder is damaged by the stepped long plunger of the respective key switch. This arrangement provides a secondary protection to the membrane circuit.

DETAILED DESCRIPTION OF THE PREFERRED EMBODIMENT

Figure 1:
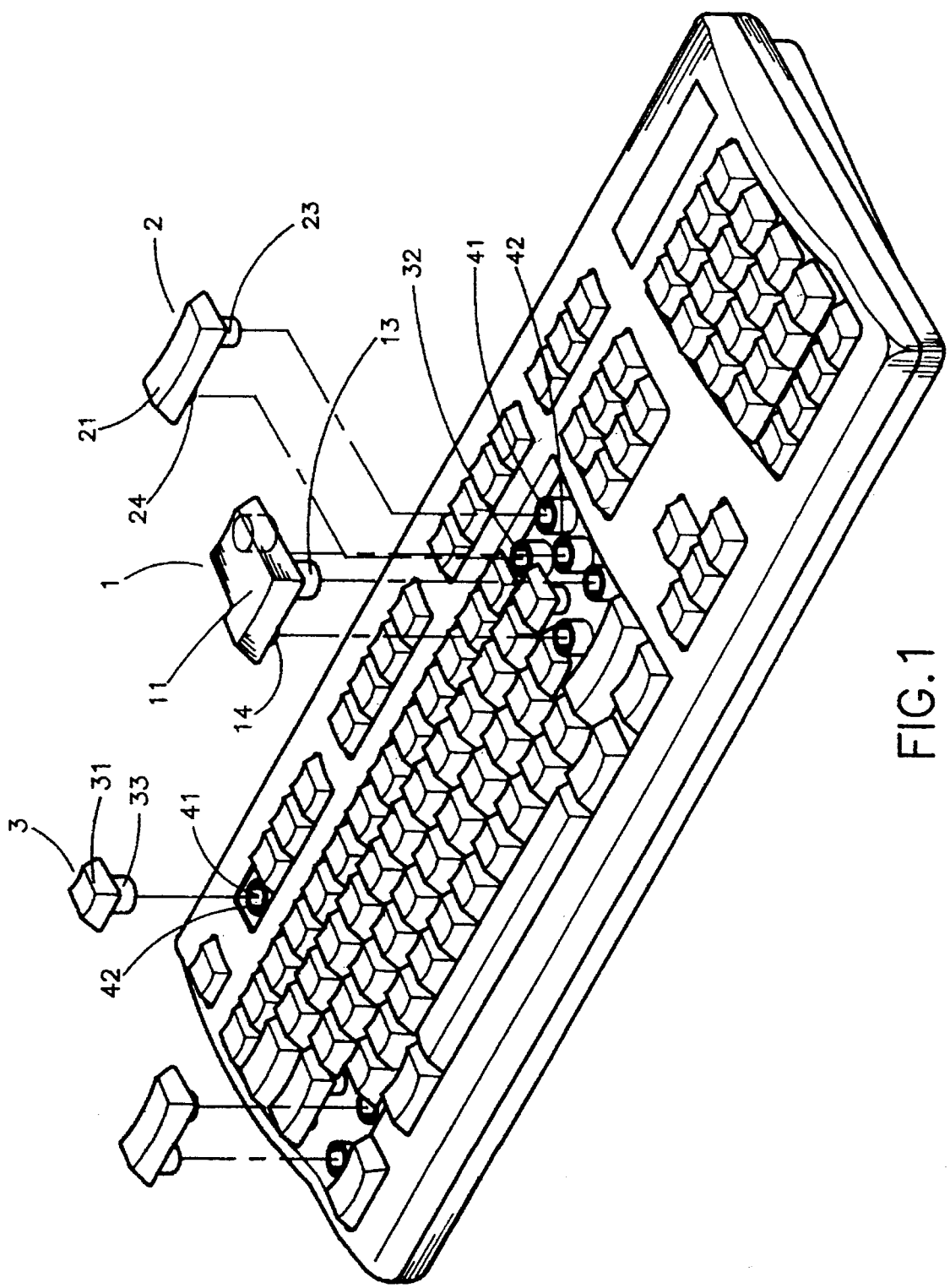
FIG. 1 is an exploded view of a keyboard according to the present invention.
Figure 2:
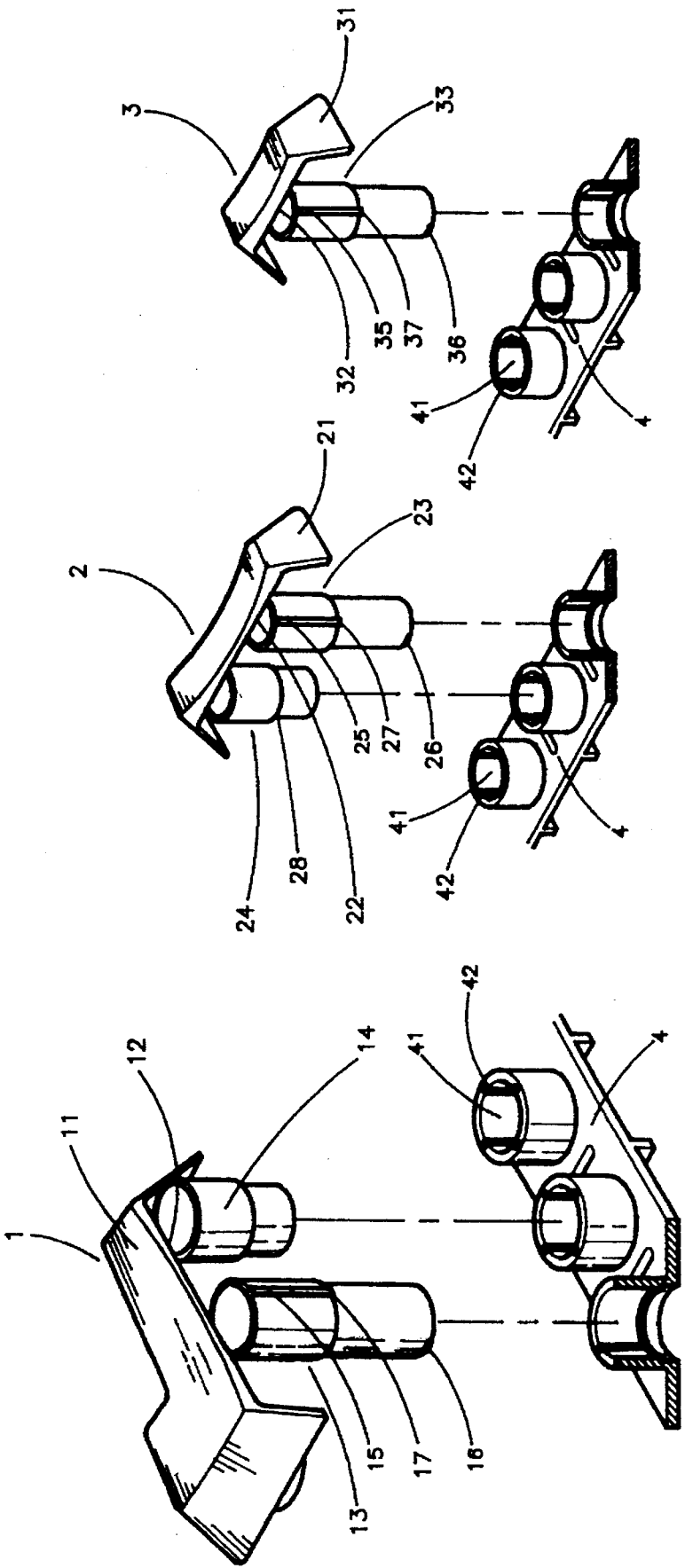
FIGS. 2A–2C are exploded views of a L-shaped key switch and an elongated key switch and a square key switch, respectively according to the present invention.

Referring to FIGS. 1, 2A, 2B, 2C and 3, the present invention comprises one L-shaped key switch 1 (for example, ENTER key), a plurality of elongated key switches 2 (for example, CTRL key), a plurality of square (1×1) key switches 3, and a key holder frame 41a.

The L-shaped key switch 1 comprises a key cap 11, a stepped long plunger 13 and at least one stepped short plungers, for example, two stepped short plungers 14 respectively downwardly extended from the flat bottom side 12 of the key cap 11, wherein each stepped plunger 13 or 14 is comprised of a thicker upper part and a thinner lower part; each stepped long plunger 13 comprises a plurality of longitudinal ribs 15 symmetrically raised from the periphery of the thicker upper part and extended from the flat bottom side 12 of the key cap 11 and terminated in a respective end portion 17, and a plurality of hooks 16 at the bottom side of the thinner lower part.

The elongated key switch 2 comprises a key cap 21, a stepped long plunger 23 and at least one stepped short plunger 24 respectively downwardly extended from the flat bottom side 22 of the key cap 21, wherein each stepped plunger 23 or 24 is comprised of a thicker upper part and a thinner lower part; each stepped long plunger 23 comprises a plurality of longitudinal ribs 25 symmetrically raised from the periphery of the thicker upper part and downwardly extended from the flat bottom side 22 of the key cap 21 and terminated in a respective end portion 27, and a plurality of hooks 26 at the bottom side of the thinner lower part.

The square key switch 3 comprises a key cap 31, a stepped long plunger 33 downwardly extended from the flat bottom side 32 of the key cap 31, wherein the stepped long plunger 33 is comprised of a thicker upper part and a thinner lower part, having a plurality of longitudinal ribs 35 symmetrically raised from the periphery of the thicker upper part and extended from the flat bottom side 32 of the key cap 31 and terminated in a respective end portion 37, and a plurality of hooks 36 at the bottom side of the thinner lower part.

Figure 4:
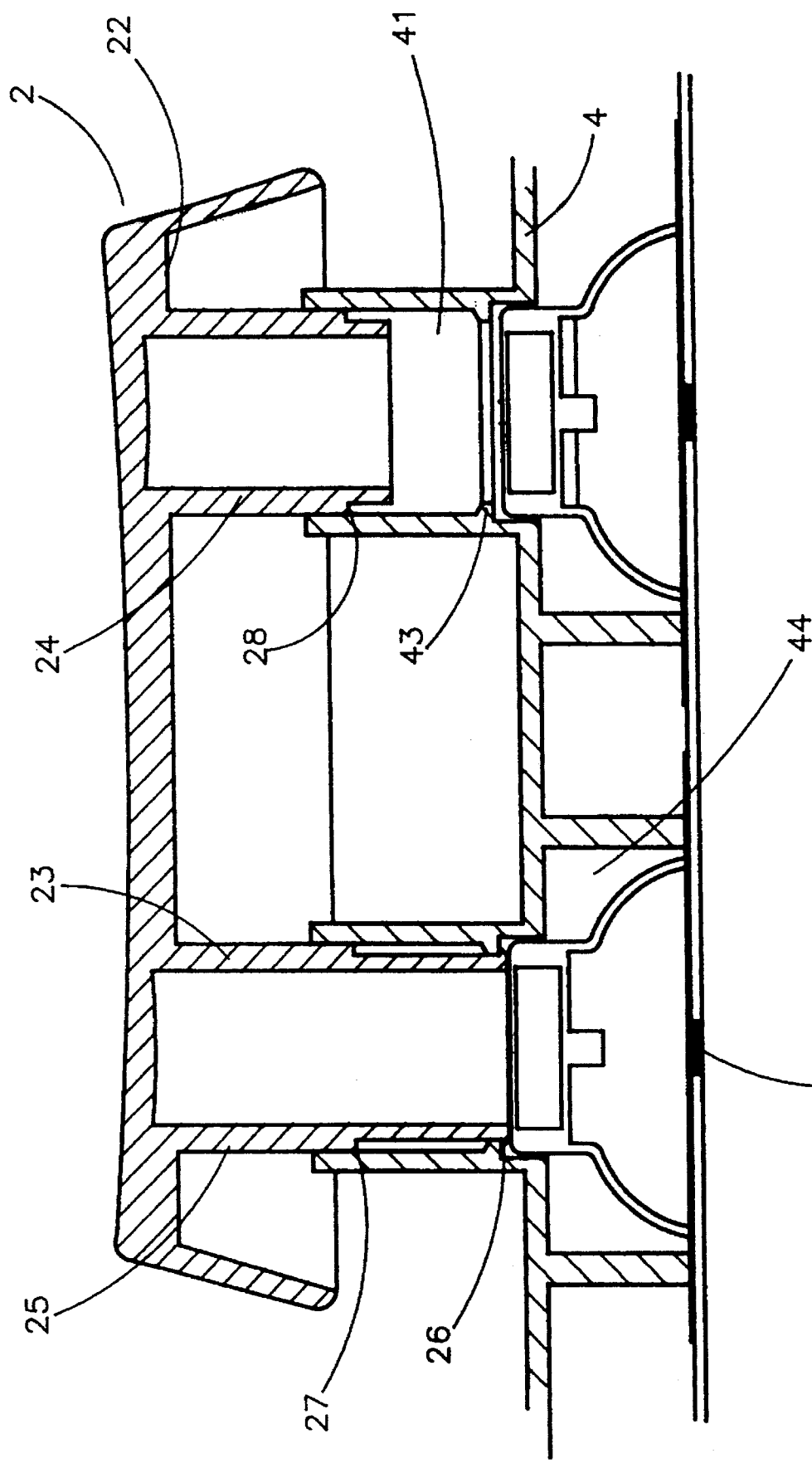
FIG. 4 is a sectional view in an enlarged scale showing an elongated key switch installed according to the present invention.

The key holder frame 41a comprises a plurality of hollow key holders 4 for mounting key switches 1, 2 and 3, wherein each key holder 4 comprises a longitudinal center through hole 41, which receives one plunger 13, 14, 23 or 24, and a plurality of longitudinal grooves 42 symmetrically spaced around the longitudinal center through hole 41 for engagement with the longitudinal ribs 15, 25 or 35 of the respective plunger 13, 14, 23 or 24, an inside annular flange 43 around the longitudinal center through hole 41 at a bottom side, and a conical bottom chamber 44, which receives one rubber cone 4a on a conductive-rubber pad 5a (see also FIG. 4).

Figure 3:
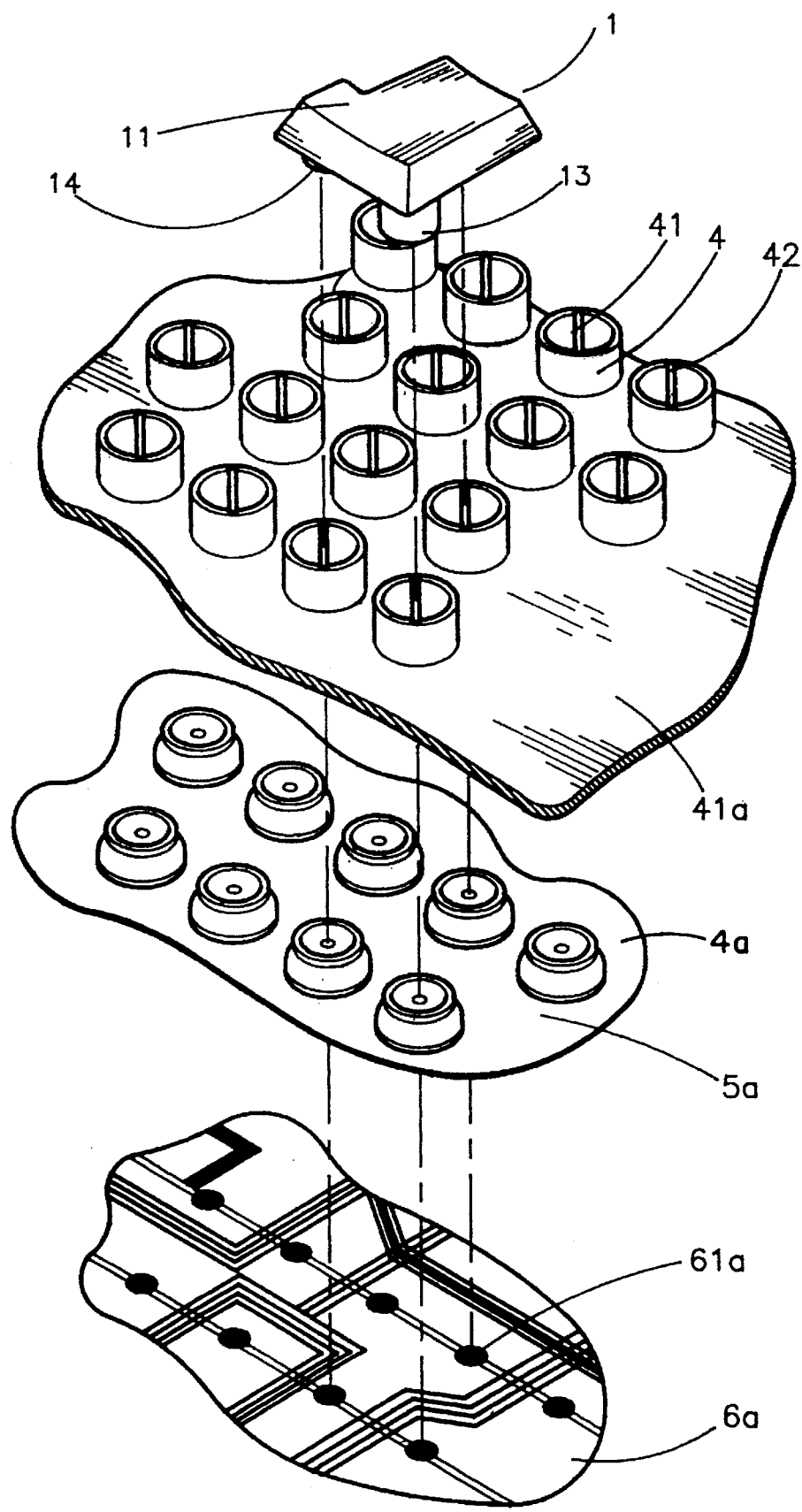
FIG. 3 is an exploded view showing the relative positions of the membrane circuit, the conductive rubber pad, the key holder frame, and the key switch according to the present invention.

The installation process of a key switch (for example, an elongated key switch 2) is simple and outlined hereinafter with reference to FIGS. 3 and 4. The stepped long plunger 23 of the elongated key switch 2 is inserted into the longitudinal center through hole 41 on the respective key holder 4 by fitting the longitudinal ribs 25 into the respective longitudinal grooves 42, permitting the hooks 26 to hook on the bottom side of the inside annular flange 43 of the respective key holder 4, then the key holder frame 41a is placed on the conductive rubber pad 5a above the membrane circuit 6a. When installed, the at least one stepped short plunger 24 is respectively inserted into a respective adjacent key holder and suspended in the longitudinal center through hole of the respective key holder at the top. The installation process of the L-shaped key switch 1 is similar to that of the elongated key switch 2.

Figure 5:
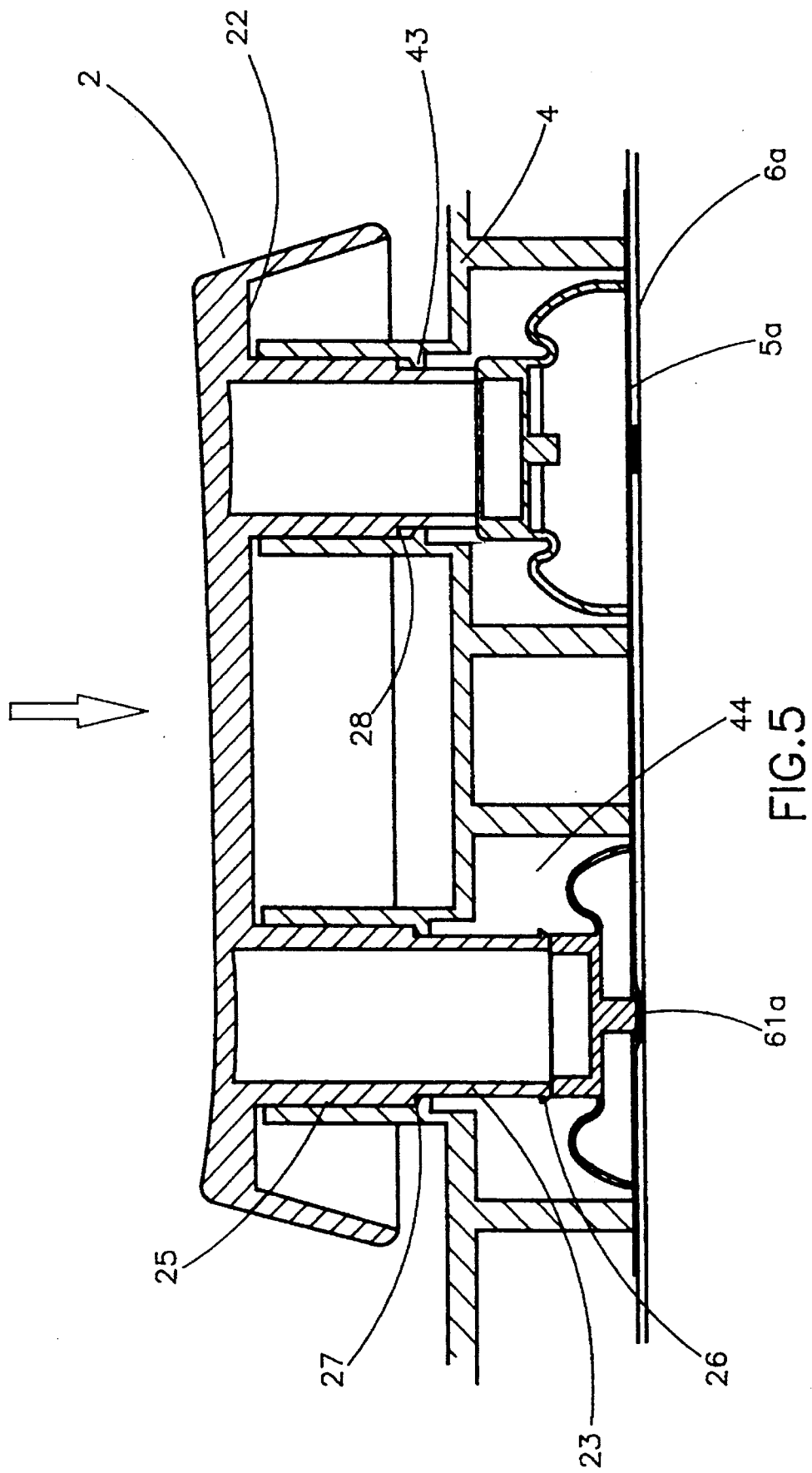
FIG. 5 is similar to FIG. 4 but showing the key switch depressed.
Figure 6:
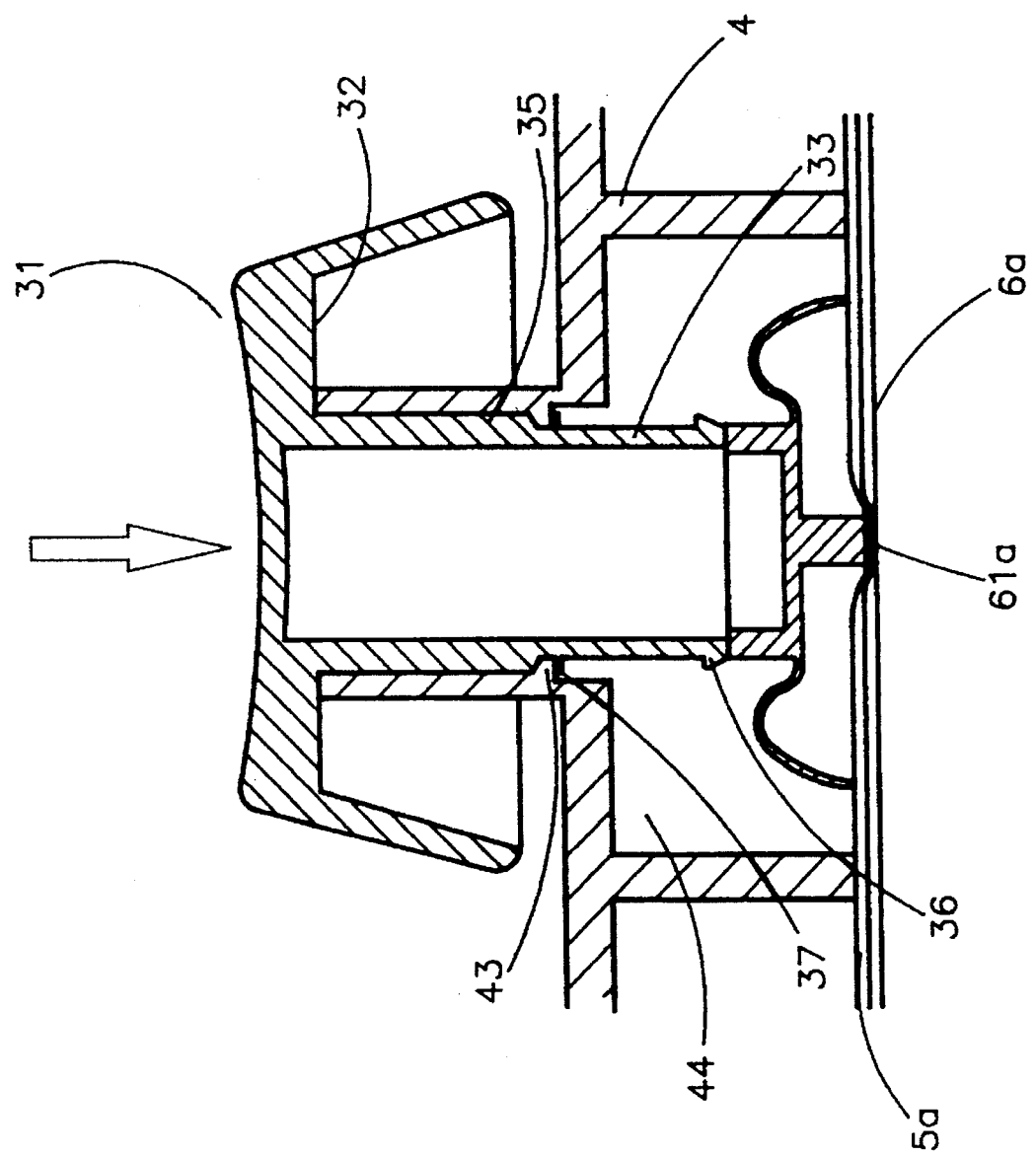
FIG. 6 is an end view of FIG. 5.
Figure 7:
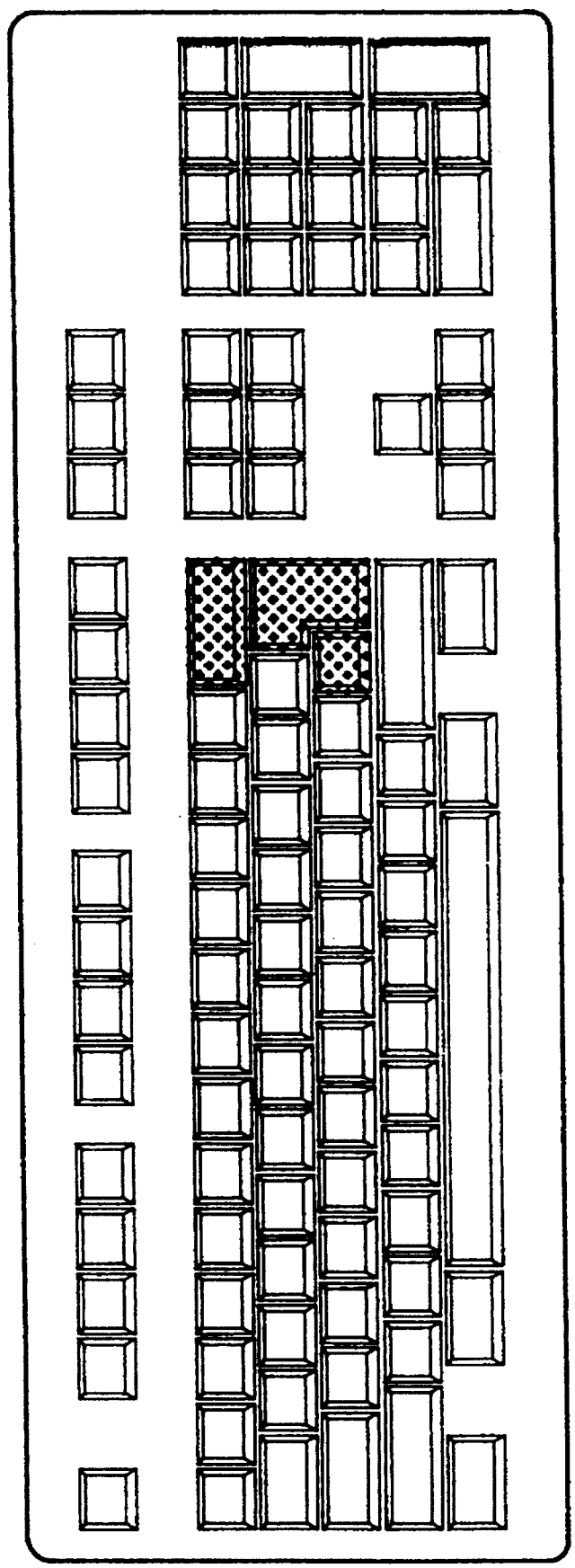
FIG. 7 shows one keyboard layout according to the present invention.
Figure 8:
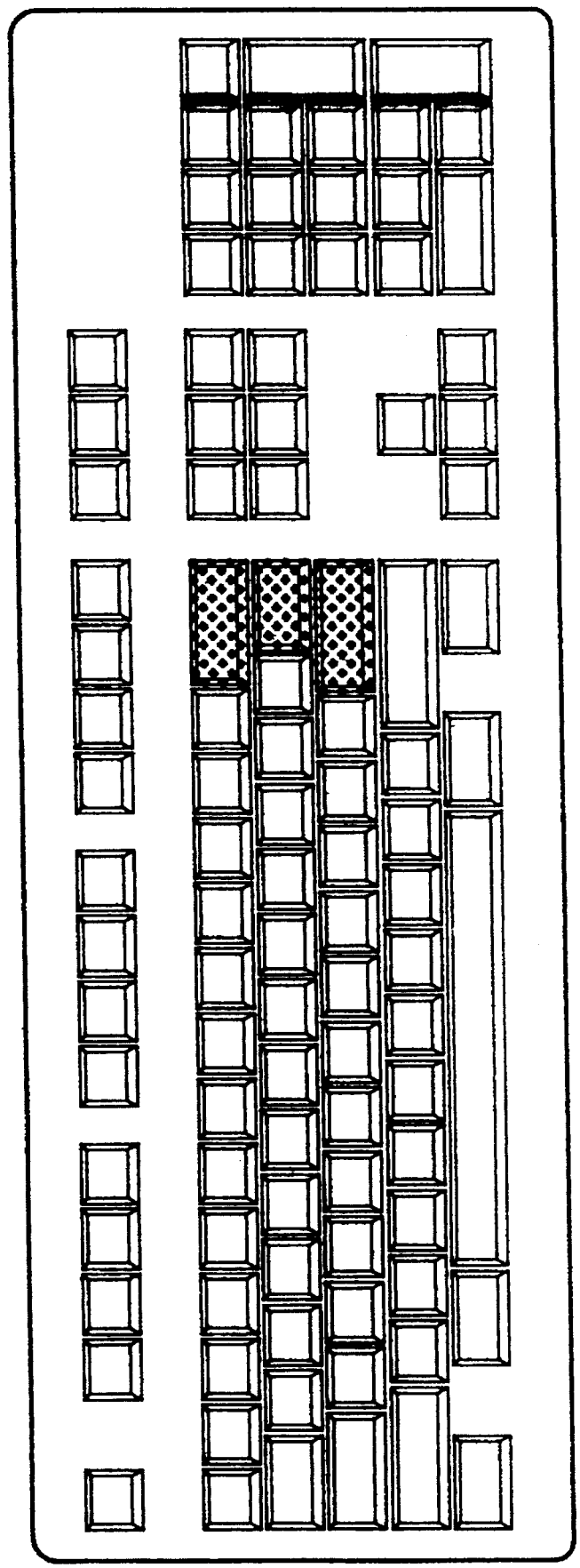
FIG. 8 shows another keyboard layout according to the present invention.
Figure 9:
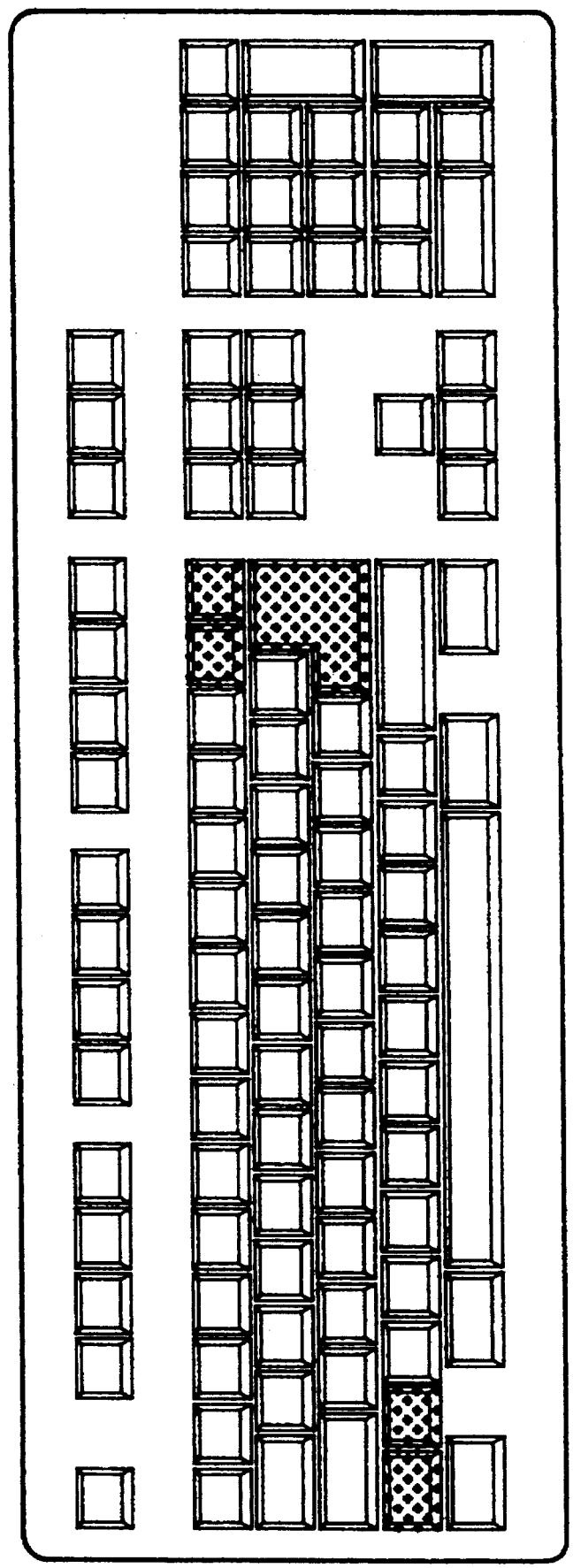
FIG. 9 shows still another keyboard layout according to the present invention.
Figure 10:
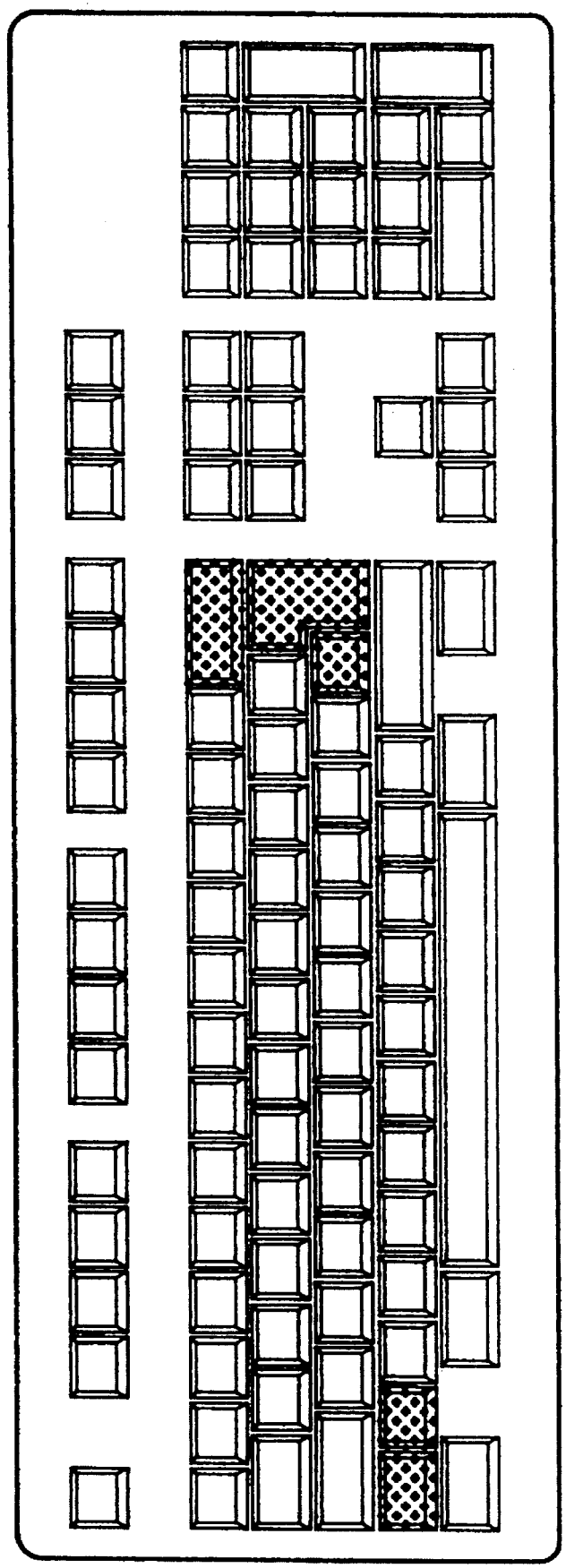
FIG. 10 shows still another keyboard layout according to the present invention.
Figure 11:
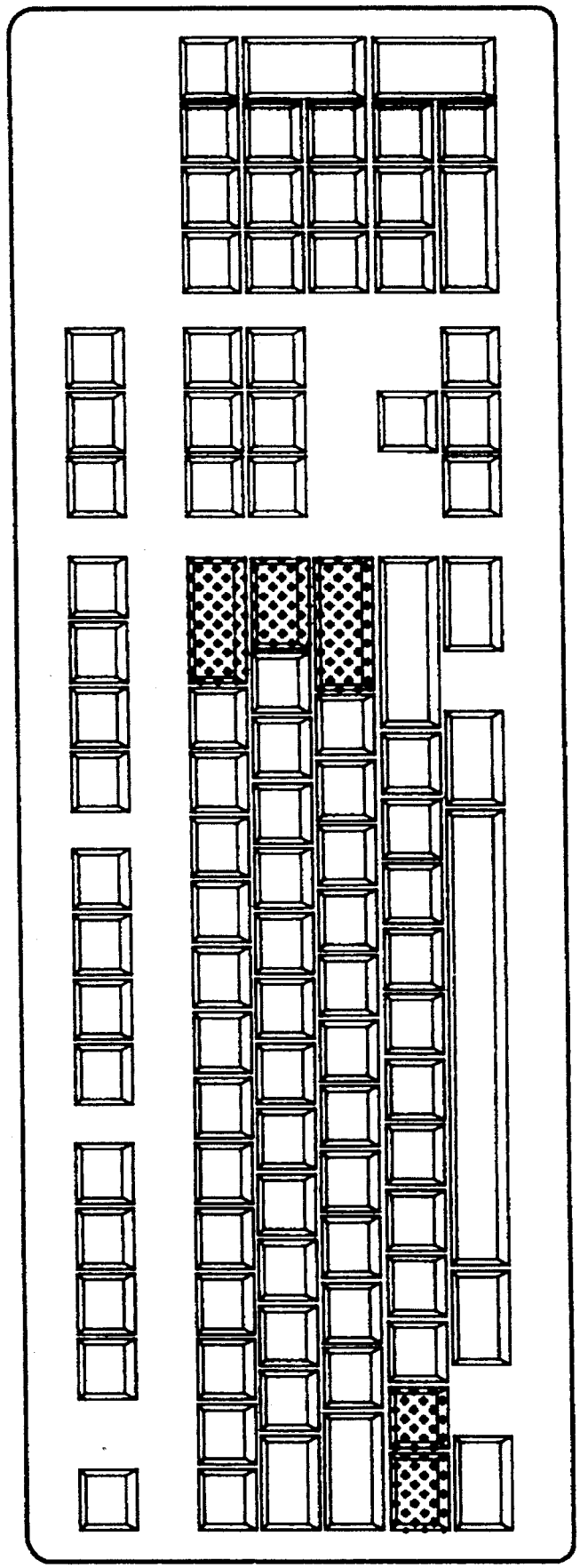
FIG. 11 shows still another keyboard layout according to the present invention.
Figure 12:
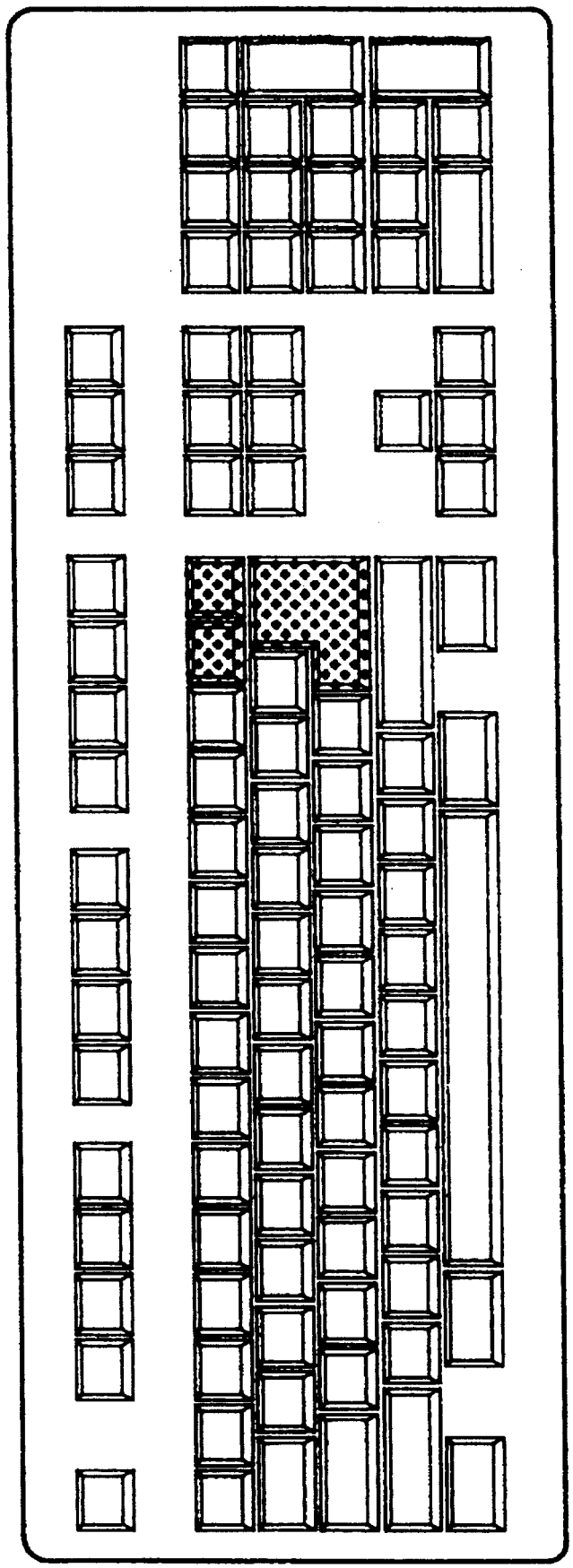
FIG. 12 shows still another keyboard layout according to the present invention.

Referring to FIGS. 5 and 6, when the key switch 2 is depressed to lower the stepped long plunger 23 and the at least one stepped short plunger 24, the stepped long plunger 23 will be forced to compress the respective rubber cone 4a on the conductive rubber pad 5a, causing it to trigger a respective electric contact 61a on the membrane circuit 6a in producing a respective electric signal, at the same time, the end portions 27 of the longitudinal ribs 26 will be simultaneously lowered to stop at the inside annular flange 43 of the respective key holder 4 to limit the down stroke of the stepped long plunger 23. Therefore, the stepped long plunger 23 will not be forced to strike the respective rubber cone 4a of the conductive rubber pad 5a and the membrane circuit 6a excessively. When the key switch 2 is released, the rubber cones immediately return to their former shapes, causing the plungers 23 and 25 moved upwards to their former positions.

In case the inside annular flange 43 is damaged by the end portions 27 of the longitudinal ribs 26 after long uses, the down stroke of the stepped long plunger 23 will still be limited within a certain range because the flat bottom side 22 of the key cap 21 will be stopped above respective key holders 4, which receive the stepped long plunger 23 and the stepped short plunger 24 (see FIG. 6). Therefore, the membrane circuit 6a will not be damaged by the stepped long plunger 23.

If the L-shaped key switch 1 (ENTER key) is installed in the keyboard to replace three square key switches 3, only the stepped long plunger 13 will be forced to compress the respective rubber cone and to trigger the ENTER function control contact on the membrane circuit 6a when the L-shaped key switch 1 is depressed, and the other two contacts on the membrane circuit 6a corresponding to the stepped short plungers 14 of the L-shaped key switch 1 will not be triggered by the stepped short plungers 14 during the down stroke of the stepped long plunger 13 (see FIG. 5).

Figure 13:
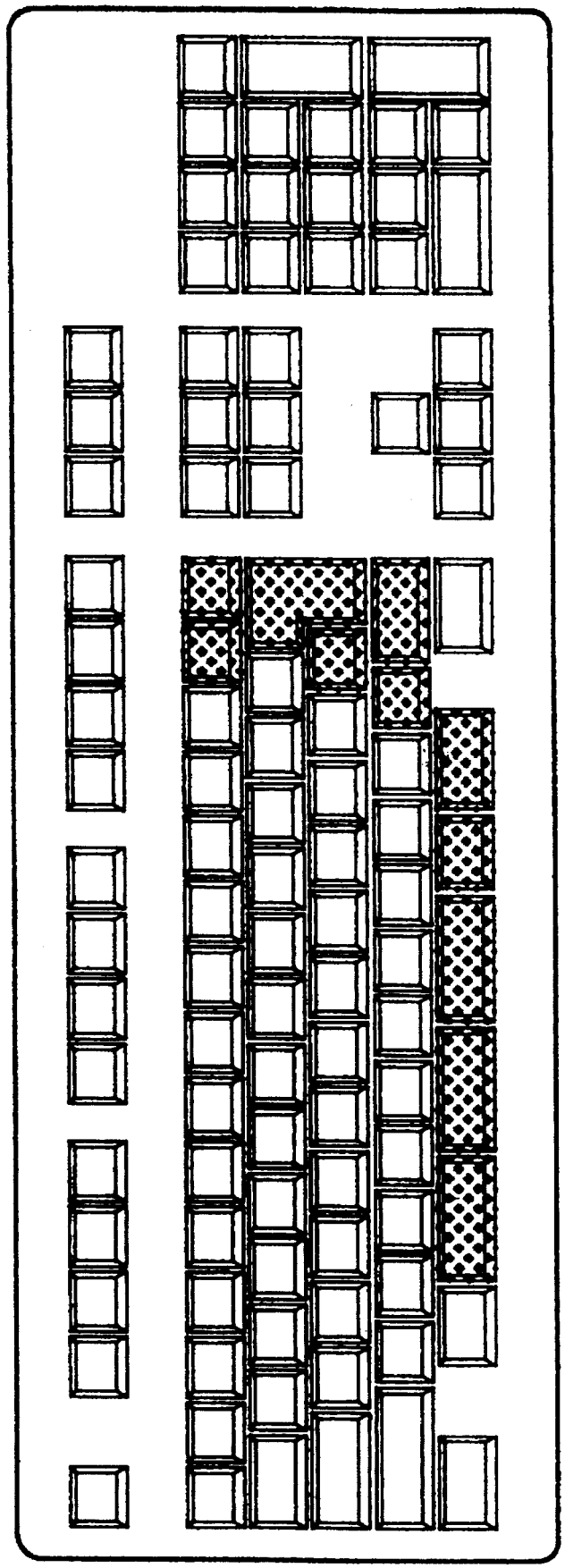
FIG. 13 shows still another keyboard layout according to the present invention.

According to the present invention, the membrane circuit 6a and the conductive rubber pad 5a can be used to match with the L-shaped key switch 1, the elongated key switches 2, and the square key switches 3 and arranged into any of a variety of forms. For example, using the same membrane circuit 6a and the same conductive rubber pad 5a, different keyboards are assembled, as shown in FIGS. 7, 8, 9, 10, 11 and 12, by arranging the L-shaped key switch 1, the elongated key switches 2 and the square key switches 3 at different locations. The keyboard shown in FIG. 13 is a DOS/V 106-key Japanese keyboard which also uses the same membrane circuit 6a and the same conductive rubber pad 5a.

It is to be understood that the drawings are designed for purposes of illustration only, and are not intended as a definition of the limits and scope of the invention disclosed.

What is claimed is:

1. A key switch unit for computer keyboards, comprising:

a membrane circuit having a plurality of electric contacts;

a conductive rubber pad mounted on said membrane circuit and having a plurality of rubber cones respectively disposed above said electric contacts;

a key holder frame mounted on said conductive rubber pad and having a plurality of key holders respectively disposed above said rubber cones, each key holder comprising a longitudinal center through hole and an inside annular flange around said longitudinal center through hole at a bottom side;

one L-shaped key switch and a plurality of elongated key switches and a plurality of square key switches respectively mounted on said key holders and depressed to trigger a respective electric contact in producing a respective electric signal;

wherein said square key switches each comprises a key cap and one stepped long plunger inserted into the longitudinal center through hole on one key holder on said key holder frame;

wherein said L-shaped key switch and said elongated key switches each comprises a key cap, one stepped long plunger and at least one stepped short plungers respectively inserted into the longitudinal center through hole on respective key holder on said key holder frame;

wherein the stepped long plungers of said square key switches and said L-shaped key switch and said elongated key switches each includes:

a thicker upper part inserted into the longitudinal center through hole on the respective key holder and suspended above the respective inside annular flange;

a thinner lower part passed through the respective inside annular flange and stopped above the respective rubber cone, a plurality of longitudinal ribs raised from a periphery of the thicker upper part and terminating in a respective end portion of the thicker upper part, and a plurality of hooks respectively extended from the thinner lower part at a bottom side of the thinner lower part and stopped below the inside annular flange of the respective key holder, end portions of said longitudinal ribs being stopped at the inside annular flange of the respective key holder, the at least one stepped short plunger being substantially same as the one stepped long plunger except a bottom portion of the thinner lower part being cut off so as to prevent the at least one stepped short plunger of the respective key switch from triggering said membrane circuit when one L-shaped key switch or one elongated key switch is depressed, so that a set of square key switches can be replaced by one L-shaped key switch or one elongated key switch without changing the conductive rubber pad and the membrane circuit, by inserting the one stepped long plunger of the L-shaped key switch or the one stepped long plunger of the elongated key switch into the respective longitudinal center through hole, which triggers the respective electric contact representing the one of replaced square key switches without triggering the respective electric contacts representing the other replaced square key switches.

2. The key switch unit of claim 1 wherein said key holders each comprises a plurality of longitudinal grooves around the respective longitudinal center through hole above the respective inside annular flange, which receive the longitudinal ribs of the respective stepped long plunger, and a conical bottom chamber below the respective inside annular flange, which receives one rubber cone.

3. The key switch unit of claim 1 wherein one key switch is depressed, the upper part of the respective stepped long plunger is stopped at the inside annular flange of the respective key holder.

4. The key switch unit of claim 1 wherein the key cap of each key switch has a flat bottom side spaced above the respective key holder, the flat bottom side of the key cap is stopped above the respective key holder to limit the down stroke of the respective key switch when the inside annular flange of the respective key holder is damaged by the stepped long plunger of the respective key switch.

* * * * *